(12) United States Patent
Taneda et al.

(10) Patent No.: US 8,312,952 B2
(45) Date of Patent: Nov. 20, 2012

(54) BATTERY POSITIONING STRUCTURE OF ELECTRIC VEHICLE

(75) Inventors: Ryoji Taneda, Okazaki (JP); Hiroyasu Suzuki, Nagoya (JP); Yuji Tozuka, Nissin (JP)

(73) Assignees: Mitsubishi Jidosha Kogyo Kabushiki Kaisha, Tokyo (JP); Mitsubishi Jidosha Engineering Kabushiki Kaisha, Okazaki-Shi, Aichi (JP)

( * ) Notice: Subject to any disclaimer, the term of this patent is extended or adjusted under 35 U.S.C. 154(b) by 0 days.

(21) Appl. No.: 13/314,094

(22) Filed: Dec. 7, 2011

(65) Prior Publication Data

US 2012/0073888 A1    Mar. 29, 2012

Related U.S. Application Data

(62) Division of application No. 12/445,407, filed on Jun. 15, 2009, now Pat. No. 8,091,669.

(30) Foreign Application Priority Data

Sep. 28, 2007   (JP) ................................ 2007-256477

(51) Int. Cl.
*B60R 16/04* (2006.01)
(52) U.S. Cl. ...................................................... 180/68.5
(58) Field of Classification Search ............... 180/65.31, 180/68.5, 312; 224/400; 429/96, 99, 100; 248/500, 503
See application file for complete search history.

(56) References Cited

U.S. PATENT DOCUMENTS

| | | | |
|---|---|---|---|
| 541,864 A | 7/1895 | Loomis | |
| 842,389 A * | 1/1907 | Decker | 429/70 |
| 1,338,690 A | 5/1920 | Moorman | |
| 1,607,908 A | 11/1926 | Nelson | |
| 1,650,527 A | 11/1927 | McKenney | |
| 1,661,779 A | 3/1928 | Ward et al. | |
| 1,677,789 A | 7/1928 | Mabey | |
| 1,734,645 A | 11/1929 | Polland | |
| 1,952,150 A * | 3/1934 | Trimble et al. | 429/96 |
| 1,982,957 A | 12/1934 | Aurora | |
| 2,022,595 A | 11/1935 | Gowing | |
| 2,216,663 A * | 10/1940 | Fogle | 180/68.5 |
| 2,326,481 A | 8/1943 | Meyer | |
| 2,415,284 A * | 2/1947 | Holman et al. | 180/68.5 |
| 2,833,363 A | 5/1958 | Henehan | |
| 2,994,395 A * | 8/1961 | Hall | 180/68.5 |
| 3,105,567 A * | 10/1963 | Schultz, Jr. | 180/68.5 |
| 3,125,177 A * | 3/1964 | Paller | 180/68.5 |

(Continued)

FOREIGN PATENT DOCUMENTS

JP    2000-301954 A    10/2000

(Continued)

*Primary Examiner* — Katy M Ebner
*Assistant Examiner* — Brodie Follman
(74) *Attorney, Agent, or Firm* — Birch, Stewart, Kolasch & Birch, LLP

(57) ABSTRACT

A battery positioning structure reliably positions battery modules on a vehicle chassis even when battery modules have different sizes and heights. The battery positioning structure includes a bracket having at opposite ends not only check plates which are configured to be positioned on a body of the electric vehicle but also locks at opposite side edges of the bracket, the bracket being configured to be attached to outer surfaces of the battery modules and to unite the battery modules, and bands configured to extend across the bracket, and linked to the locks at opposite ends of the bracket. The battery modules and the bracket are positioned on the body of the electric vehicle.

13 Claims, 8 Drawing Sheets

U.S. PATENT DOCUMENTS

| | | | | |
|---|---|---|---|---|
| 3,165,163 | A | | 1/1965 | Holka |
| 3,167,148 | A | * | 1/1965 | Hinch ............................ 180/68.5 |
| 3,167,458 | A | * | 1/1965 | Brazell ........................... 429/10 |
| 3,557,895 | A | * | 1/1971 | Thomas .......................... 180/68.5 |
| 3,623,917 | A | * | 11/1971 | Chassoux ........................ 429/99 |
| 3,866,704 | A | | 2/1975 | Bowers et al. |
| 3,904,439 | A | * | 9/1975 | Barrett, Jr. ...................... 429/99 |
| 3,961,988 | A | | 6/1976 | Andreoff |
| 4,020,244 | A | * | 4/1977 | Selinko .......................... 429/100 |
| 4,033,424 | A | * | 7/1977 | Evans ............................ 180/68.5 |
| 4,054,730 | A | * | 10/1977 | Crifasi ........................... 429/120 |
| 4,065,603 | A | * | 12/1977 | Coibion .......................... 429/99 |
| 4,077,485 | A | | 3/1978 | Bonora et al. |
| 4,098,366 | A | | 7/1978 | Reinhard et al. |
| 4,113,926 | A | * | 9/1978 | McBrien ......................... 429/99 |
| 4,252,206 | A | * | 2/1981 | Burkholder et al. ........... 180/68.5 |
| 4,317,497 | A | * | 3/1982 | Alt et al. ........................ 180/68.5 |
| 4,367,572 | A | | 1/1983 | Zielenski |
| 4,495,787 | A | * | 1/1985 | Comstock ....................... 70/258 |
| 4,508,794 | A | * | 4/1985 | Wright ........................... 429/100 |
| 4,520,887 | A | | 6/1985 | DiFazio |
| 4,642,274 | A | * | 2/1987 | Tsutsumi et al. .............. 429/434 |
| 4,723,618 | A | * | 2/1988 | Coonradt ........................ 180/68.5 |
| 4,754,827 | A | * | 7/1988 | Hirabayashi .................... 180/68.5 |
| 4,819,955 | A | | 4/1989 | Cobb |
| 4,883,725 | A | * | 11/1989 | Gerard ........................... 429/99 |
| 4,936,409 | A | | 6/1990 | Nix et al. |
| 5,052,198 | A | * | 10/1991 | Watts .............................. 70/58 |
| 5,140,744 | A | | 8/1992 | Miller |
| 5,197,559 | A | | 3/1993 | Garin, III et al. |
| 5,222,711 | A | * | 6/1993 | Bell ................................ 248/503 |
| 5,377,947 | A | * | 1/1995 | Johnson ......................... 248/503 |
| 5,379,184 | A | * | 1/1995 | Barraza et al. ............ 361/679.33 |
| 5,390,754 | A | * | 2/1995 | Masuyama et al. ........... 180/68.5 |
| 5,522,734 | A | * | 6/1996 | Goertzen ........................ 439/500 |
| 5,534,364 | A | * | 7/1996 | Watanabe et al. .............. 429/61 |
| 5,536,595 | A | * | 7/1996 | Inkmann et al. ............... 429/120 |
| 5,547,160 | A | * | 8/1996 | Johnson .......................... 248/503 |
| 5,663,008 | A | | 9/1997 | Shimakawa et al. |
| 5,681,668 | A | * | 10/1997 | Reed et al. ..................... 429/100 |
| 5,709,280 | A | * | 1/1998 | Beckley et al. ................ 180/68.5 |
| 5,766,801 | A | * | 6/1998 | Inoue et al. .................... 429/99 |
| 5,806,618 | A | | 9/1998 | Luode |
| 5,987,936 | A | | 11/1999 | Hartman, Jr. |
| 6,085,854 | A | | 7/2000 | Nishikawa |
| 6,102,356 | A | * | 8/2000 | Huntley et al. ................ 248/500 |
| 6,138,483 | A | * | 10/2000 | Galant ............................ 70/58 |
| 6,145,612 | A | | 11/2000 | Dickie |
| 6,189,635 | B1 | * | 2/2001 | Schuler et al. ................. 180/68.5 |
| 6,224,998 | B1 | * | 5/2001 | Brouns et al. ................. 429/100 |
| 6,431,300 | B1 | | 8/2002 | Iwase |
| 6,521,371 | B1 | * | 2/2003 | Lavanture ..................... 429/100 |
| 6,622,809 | B2 | * | 9/2003 | Takahashi .................... 180/68.5 |
| 6,648,090 | B2 | * | 11/2003 | Iwase ........................... 180/68.5 |
| 6,855,448 | B2 | * | 2/2005 | Kikuchi et al. ............... 429/454 |
| 6,871,829 | B2 | * | 3/2005 | Shannon, Jr. ................. 248/505 |
| 7,014,002 | B2 | * | 3/2006 | Mizuta ......................... 180/68.5 |
| 7,128,999 | B1 | * | 10/2006 | Martin et al. .................. 429/99 |
| 7,144,647 | B2 | | 12/2006 | Sugita et al. |
| 7,323,271 | B2 | * | 1/2008 | Marraffa ....................... 429/99 |
| 7,331,559 | B2 | | 2/2008 | Hirayu |
| 7,350,610 | B2 | | 4/2008 | Kikuchi |
| 7,384,704 | B2 | | 6/2008 | Scott |
| 7,398,848 | B2 | | 7/2008 | Kondo |
| 7,398,849 | B2 | * | 7/2008 | Yoshida ....................... 180/68.5 |
| 7,399,551 | B2 | * | 7/2008 | Yagi et al. .................... 429/148 |
| 7,507,499 | B2 | | 3/2009 | Zhou et al. |
| 7,533,748 | B2 | * | 5/2009 | Miyajima et al. ............ 180/68.5 |
| 7,641,017 | B2 | | 1/2010 | Nozaki et al. |
| D611,413 | S | | 3/2010 | Brockington |
| 7,719,233 | B2 | | 5/2010 | Tononishi |
| 8,091,669 | B2 | * | 1/2012 | Taneda et al. ................ 180/68.5 |
| 2002/0093246 | A1 | * | 7/2002 | Takahashi ...................... 307/9.1 |
| 2002/0157886 | A1 | * | 10/2002 | Iwase ........................... 180/68.5 |
| 2003/0226699 | A1 | | 12/2003 | Cheng |
| 2004/0170888 | A1 | | 9/2004 | Cummins et al. |
| 2005/0153199 | A1 | * | 7/2005 | Yagi et al. .................... 429/148 |
| 2005/0170223 | A1 | | 8/2005 | Okazaki |
| 2005/0173170 | A1 | * | 8/2005 | Miyajima et al. ............ 180/68.5 |
| 2005/0224683 | A1 | * | 10/2005 | Hirayu ......................... 248/500 |
| 2005/0260488 | A1 | * | 11/2005 | Zhou et al. .................... 429/99 |
| 2006/0096794 | A1 | | 5/2006 | Yoshida |
| 2007/0042263 | A1 | * | 2/2007 | Balash ........................... 429/99 |
| 2007/0151785 | A1 | | 7/2007 | Huang |
| 2007/0190409 | A1 | * | 8/2007 | Sakurai ......................... 429/159 |
| 2007/0284167 | A1 | * | 12/2007 | Watanabe et al. ............ 180/68.5 |
| 2008/0078597 | A1 | * | 4/2008 | Voigt et al. .................. 180/68.5 |
| 2008/0284375 | A1 | | 11/2008 | Nagaoka et al. |
| 2008/0318119 | A1 | * | 12/2008 | Watanabe et al. ............. 429/99 |
| 2009/0004554 | A1 | | 1/2009 | Reed et al. |
| 2009/0095550 | A1 | * | 4/2009 | Batdorff ........................ 180/68.5 |
| 2009/0166116 | A1 | * | 7/2009 | Kiya et al. .................... 180/68.5 |
| 2009/0178868 | A1 | | 7/2009 | Oohashi |
| 2010/0000816 | A1 | * | 1/2010 | Okada ........................... 180/68.5 |
| 2010/0175940 | A1 | * | 7/2010 | Taneda et al. ................ 180/68.5 |
| 2011/0165451 | A1 | * | 7/2011 | Kim et al. ..................... 429/153 |
| 2012/0073888 | A1 | * | 3/2012 | Taneda et al. ................ 180/68.5 |

FOREIGN PATENT DOCUMENTS

| | | |
|---|---|---|
| JP | 2002-205555 A | 7/2002 |
| JP | 2002-205556 A | 7/2002 |
| JP | 2005-216783 A | 8/2005 |
| JP | 2006-40644 A | 2/2006 |
| JP | 2006-236826 A | 9/2006 |
| JP | 2006-294338 A | 10/2006 |
| JP | 2007-80743 A | 3/2007 |

* cited by examiner

BATTERY POSITIONING STRUCTURE OF ELECTRIC VEHICLE

This application is a Divisional of application Ser. No. 12/445,407, filed on Jun. 15, 2009 now U.S. Pat. No. 8,091,669, the entire contents of which are hereby incorporated by reference and for which priority is claimed under 35 U.S.C. §120.

BACKGROUND OF THE INVENTION

1. Field of the Invention

The present invention relates to a battery positioning structure of an electric vehicle which includes a plurality of battery modules constituted by a plurality of battery cells.

2. Description of the Related Art

Generally, an electric vehicle is provided with a motor as a drive unit and a battery unit as a power source, and is driven by the motor which is actuated by power supplied by the battery unit. A travelling distance of the electric vehicle depends upon performance and capacity of the battery unit. Therefore, the electric vehicle generally includes the battery unit which is constituted by a plurality of battery modules containing rechargeable battery cells. Whenever a battery voltage is decreased, battery cells will be recharged.

It is very troublesome to position such a battery unit containing a plurality of battery modules on a vehicle body. Patent Publication No. 3050010 discloses fixing battery modules to a vehicle body. In the Patent Publication, a plurality of battery modules are mounted on a tray which is provided on the vehicle body. The battery modules are fastened, by using bolts or the like, to the tray using long and thin brackets which extend across the battery modules.

SUMMARY OF THE INVENTION

Problems to be Solved by the Invention

In the foregoing related art, the battery modules are placed on the tray, and are simultaneously held down by the bracket which is put on the battery modules. If the battery modules are different in their sizes, height and so on, there will be spaces between low battery modules and the bracket. In such a case, the battery modules may become loose while driving on bumpy roads. When the bracket is excessively fastened in order to overcome this problem, tall battery modules will be subject to large fastening loads. Further, when the bracket is fastened on the tray by inserting bolts into screws of the tray, some screws will be covered by battery modules which should be placed on the tray. With the related art, it is possible to reduce the number of components but it seems that assembling work will become troublesome.

The present invention is intended to provide a battery positioning structure which can reliably position battery modules in an electric vehicle even if battery modules have different sizes or heights.

Means to Solve the Problem

In accordance with one aspect of the present invention, there is provided a battery positioning structure for an electric vehicle which includes a plurality of battery units constituted by battery modules. The battery positioning structure includes: a bracket having at opposite ends not only check plates which are configured to be positioned on a body of the electric vehicle but also locks at opposite side edges of the bracket, the bracket being configured to be attached to outer surfaces of the battery modules and to unite the battery cells, and bands configured to extend across the bracket and linked to the locks at opposite ends of the bracket, in which the battery modules and the bracket are positioned on the body of the electric vehicle.

In the present invention, the bracket may be made of a steel plate, and may be attached around the battery modules except at module terminals.

Further, one of the check plates may be detachably supported by the bracket.

Further, one of the check plates may be detachably supported by the bracket.

Further, there may be a plurality of check plates with spaces maintained between them.

Further, there may be a plurality of check plates with spaces maintained between them.

Further, there may be a plurality of check plates with spaces maintained between them.

According to another aspect of the present invention, there is provided a battery positioning structure for an electric vehicle which includes a plurality of battery modules constituted by battery cells. The battery positioning structure includes: a pair of brackets configured to be attached to an outer surfaces of battery modules, and having check plates which are detachably attached to thereto and bands configured to extend across the brackets and tied to locks at opposite ends of the brackets. The battery modules and the brackets are positioned on the body of the electric vehicle.

Further, the brackets may be made of steel plates and are shaped not to come into contact with terminals of the battery modules.

Effects of the Invention

When positioning the battery system, having a plurality of battery modules, on a vehicle body, the metal bracket attached around the battery modules is fastened to bolts of the vehicle body, and is covered by bands. The bands are fixedly attached to locks. Even when battery modules have different sizes and heights, they can be reliably and efficiently positioned on the vehicle body since size and height differences of the battery modules can be absorbed depending upon where the bands are fastened to the locks.

According to the invention, the metal bracket is attached on the outer surface of the battery modules at positions where there are no module terminals. Even if crashing energy is applied to the vehicle body, the bracket can reliably hold the battery modules on the vehicle body, do not come into contact with the module terminals, and protect the battery modules against crashing.

In accordance with the invention, one of check plates is detachably supported by the bracket. The bolts and check plates are aligned. Thereafter, the bracket is attached to the battery modules, and is fixed to the vehicle body with good workability.

Further, since a plurality of cylindrical parts of the check plates are formed with spaces kept between them, it is possible to reduce load applied to one cylindrical part when crashing energy is applied to the vehicle body. This is effective in reliably positioning the battery units on the vehicle body, and protecting the vehicle against crashing force.

Still further, a pair of brackets are attached on outer surfaces of a plurality of battery modules, and unite the battery modules. The check plates with cylindrical parts to be attached to bolts of the vehicle body are temporarily attached to the brackets. Even if battery modules have different sizes or heights, they can be reliably and efficiently attached on the vehicle body without applying undue loads to the battery modules.

The brackets are made of metal sheets, and are shaped not to come into contact with the module terminals. Even if battery module are moved due to crashing energy, the battery system can be reliably kept safe at the time of crashing.

Figure 1:
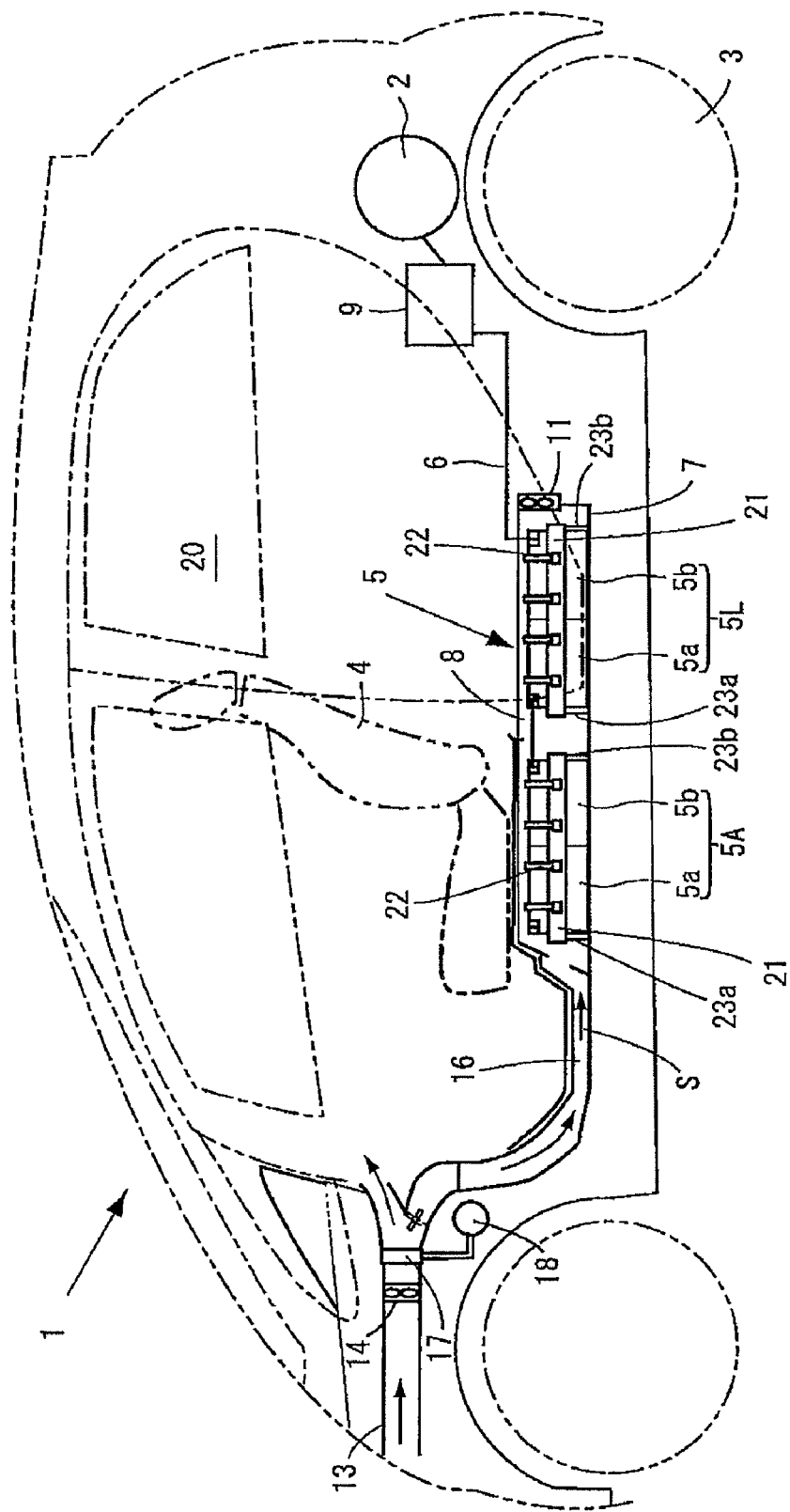
FIG. 1 is a schematic view showing a configuration of an electric vehicle including a battery positioning structure according to an embodiment of the invention.

DESCRIPTION OF REFERENCE NUMERALS 1 electric vehicle
5a, 5b battery modules
5c periphery of battery module
21 bracket
21c, 21d opposite ends of bracket
22 bands
22a, 22b opposite ends of bands
23a, 23b bolts
24, 25 check plates?
24a, 24b cylindrical parts?
21a, 21b opposite ends of bracket
26 locks
31, 32 a pair of brackets
34a, 35a folds
34, 35 check plates
210 terminal

DETAILED DESCRIPTION OF THE INVENTION

The battery positioning structure can position battery units with good reliability and workability even when battery modules have different sizes or heights. The battery positioning structure includes a bracket and bands. The battery modules are fitted into the bracket, and are firmly held by the bands which extend across the bracket, and have their opposite ends linked to locks at opposite side edges of the bracket.

DESCRIPTION OF EMBODIMENTS

The invention will be described with reference to embodiments shown in the drawings. Referring to FIG. 1, an electric vehicle 1 is driven by rotating wheels 3 which are rotated by a motor 2. The motor 2 is actuated by power supplied from a battery system 5. The battery system 5 is positioned under seats 4 in an interior of the electric vehicle. The battery system 5 is constituted by a plurality of battery units, each of which includes battery modules. Each battery module is constituted by one battery cell. The battery system 5 is housed in a battery container 8 defined by a floor panel 6 constituting a vehicle body and a shield plate 7 under the floor panel 6.

Further, the electric vehicle 1 includes a blower 14 and a compressor 18 which are located in an air intake path 13. When the compressor 18 is actuated, airstreams are taken in, are cooled by a cooling medium circulating between the blower 14 and a heat exchanger 17, and are changed to cold airstreams S. The cold airstreams S are introduced into the battery system container 8 via a cooling duct 16, and are finally discharged to the exterior by an exhaust fan 11.

Figure 2:
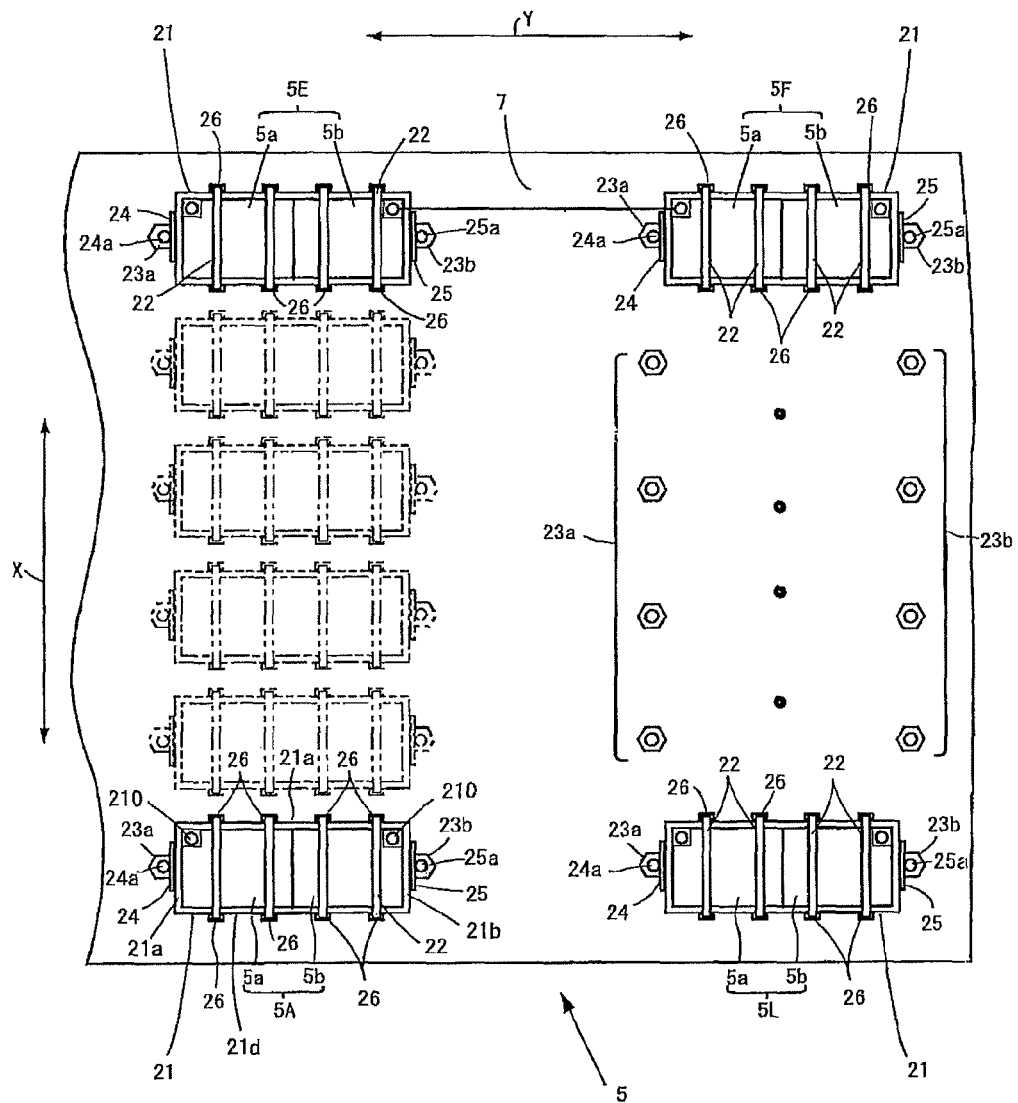
FIG. 2 is an enlarged view of battery modules arranged by the battery fixing structure.

Referring to FIG. 2, the battery system 5 includes 12 battery units. Specifically, each battery unit is constituted by two battery modules 5a and 5b which are arranged in a moving direction Y of the electric vehicle 1. Six battery units are arranged in a direction X along a width of the electric vehicle 1, and constitute one battery group. Another battery group is positioned downstream of the foregoing battery group. In other words, the 12 battery units 5A to 5L are mounted on the shield plate 7, and are connected in series.

The battery units 5A to 5L are positioned on the shield plate 7 using the same battery positioning structures as shown in FIG. 1 and FIG. 2. One battery positioning structure will be described with reference to the battery unit 5A. The battery positioning structure holds the battery unit 5A using a bracket 21 and a plurality of bands 22, and is fixed on the shield plate 7 by inserting nuts (not shown) into bolts 23a and 23b provided on the shield plate 7.

Figure 3:
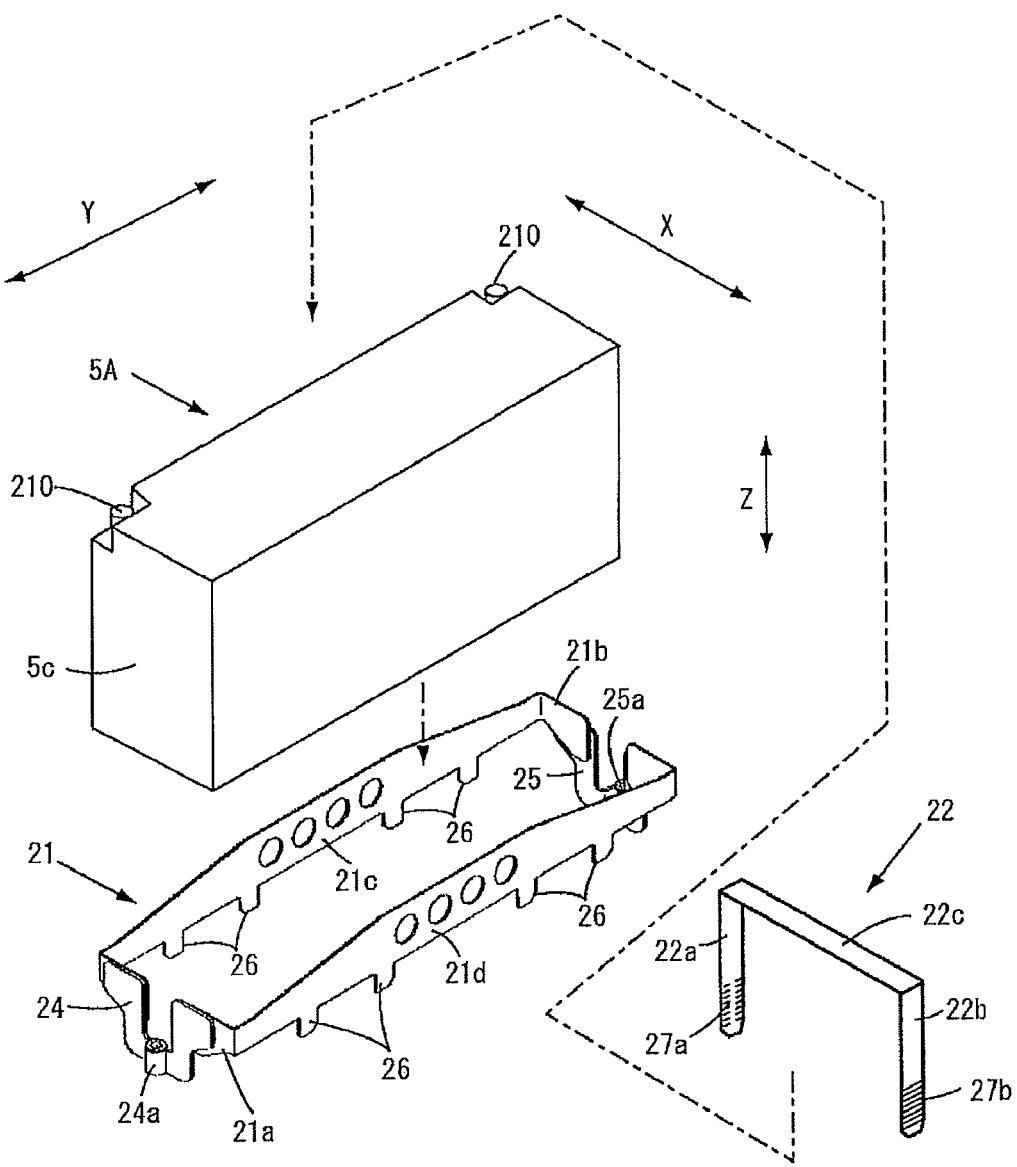
FIG. 3 is an exploded perspective view of a bracket, a belt and locks which constitute the battery positioning structure.

The bracket 21 is in the shape of a rectangular frame, and is attached to a periphery 5c (see FIG. 3) of the battery unit 5A at positions where there are no terminals 210 of the battery modules 5a and 5b. When attached, the bracket 21 becomes integral to the battery unit 5A. Check plates 24 and 25 are present at the opposite ends of the bracket 21, and are joined to the bolts 23a and 23b. Side surfaces 21c and 21d of the bracket 21 face each other in the direction X, and have a plurality of locks 26 arranged in the moving direction Y of the electric vehicle 1.

The bracket 21 and check plates 24 and 25 are made of steel plates. The check plates 24 and 25 are provided with cylindrical parts 24a and 25a. The cylindrical parts 24a and 25a receive the bolts 23a and 23b therein.

Figure 4A:
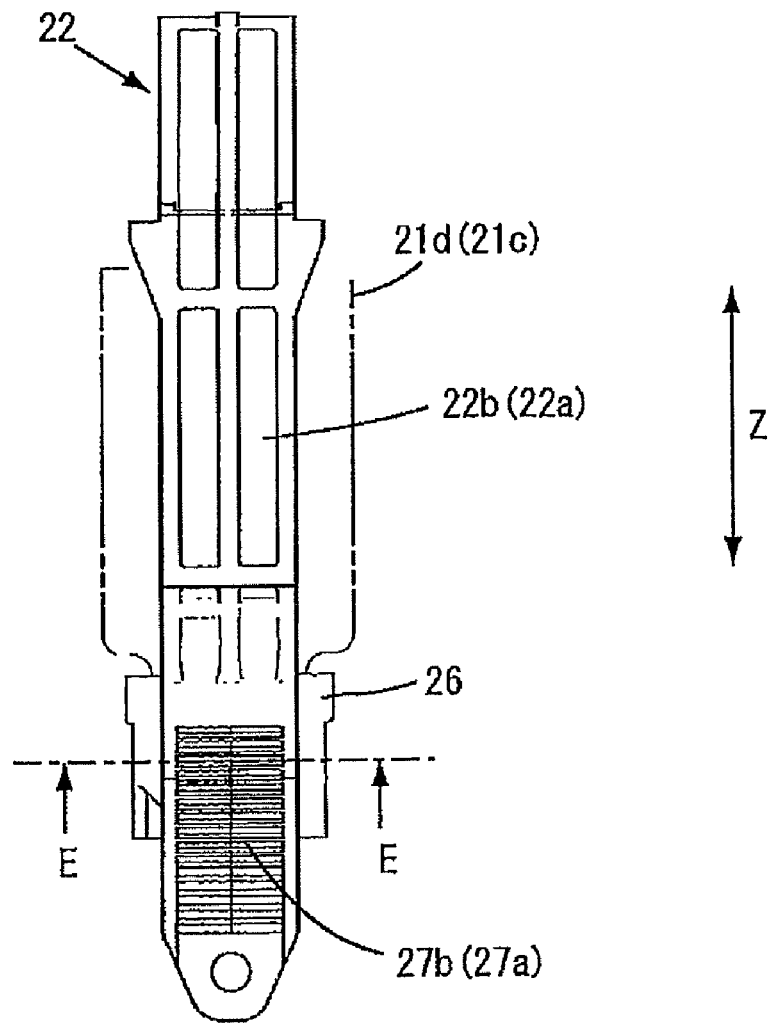
FIG. 4(a) is an enlarged view of one of locks.
Figure 4B:
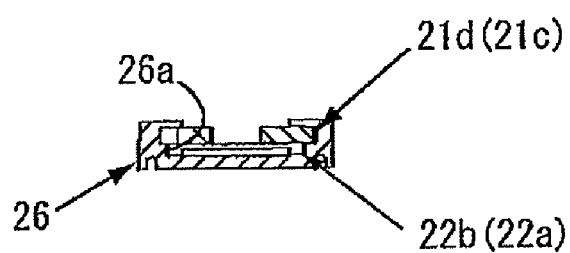
FIG. 4(b) is a cross sectional view taken along line E-E in FIG. 4(a).
Figure 5:
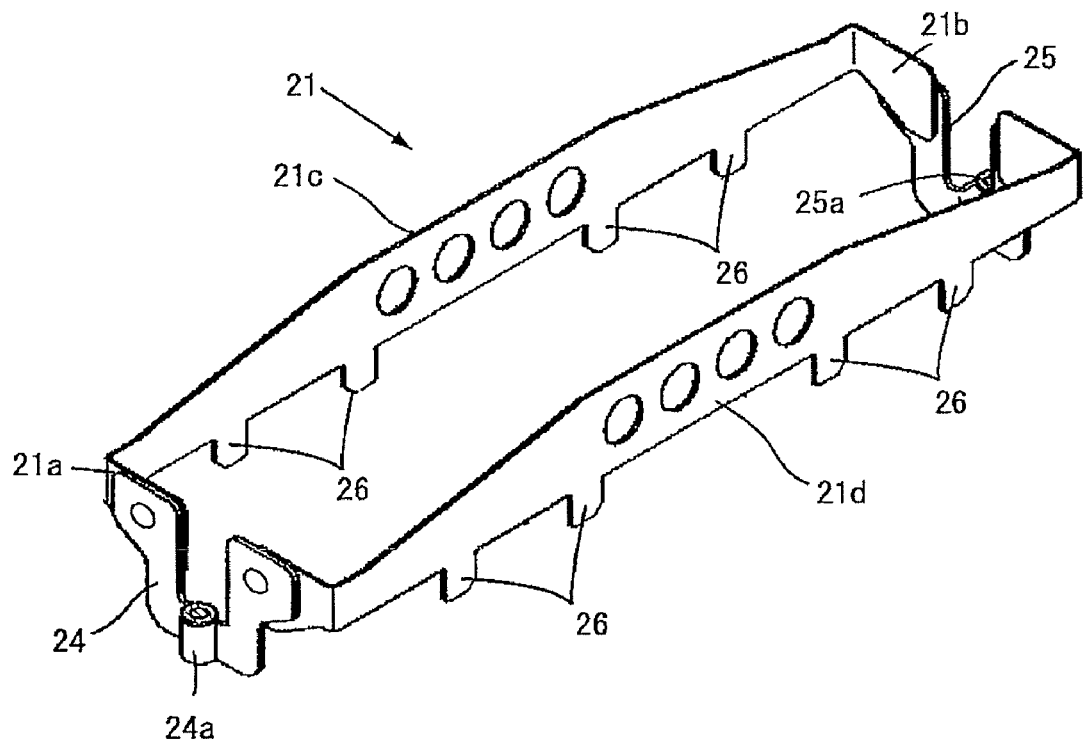
FIG. 5 is an enlarged perspective view of a modified example of the bracket.

Each of the bands 22 is in the shape of a gate, spans across the side surfaces 21c and 21d of the bracket 21, has its bent edges fitted into locks 26, and is fastened. Referring to FIG. 4(a), each band 22 has teeth 27a and 27b at its ends 22a and 22b, and is movable in a direction Z.

The locks 26 are positioned on the lower side edges 21c and 21d of the bracket 21. Each lock 26 has a recess 26a, is configured to be engaged with the teeth 27a and 27b of the band 22, and functions as a ratchet which enables the band 22 to be inserted but prevents it from being detached.

The bracket 21 having the check plates 24 and 25 and locks 26 is attached, from an upper or lower side, to the periphery 5c of the two battery modules 5a and 5b which are laid side by side. In this state, the two battery modules 5a and 5b are united (as the battery unit 5A, for instance). A position of the bracket 21 to be attached to the battery cells 5a and 5b is at a height where the bolts 23a and 23b can be fitted into the cylindrical parts 24a and 25a. When the bolts 23a and 23b are fitted into the cylindrical parts 24*a* and 25*a*, the battery unit 5A is positioned and fastened the vehicle body by the bolts 23*a* and 23*b*.

Thereafter, each of the bands 22 is spanned over an outer surface of the bracket 21 from above the battery unit 5A (battery modules 5*a* and 5*b*) positioned on the shield plate 7. The opposite ends 22*a* and 22*b* of the band 22 are fitted into the recess 26*a* of the lock 26 until a center 22*c* of the band 22 comes into contact with upper surfaces of the battery modules 5*a* and 5*b*. The band 22 attached to the bracket 21 prevents the battery modules 5*a* and 5*b* from being disengaged from the bracket 21.

After attaching the bands 22, the bolts 23*a* and 23*b* fitted into the cylindrical parts 24*a* and 25*a* are fastened, so that the battery unit 5A (the battery modules 5*a* and 5*b*) will be fixed on the shield plate 7 via the bracket 21. With the battery positioning structure, each bracket 21 attached to the battery cells 5*a* and 5*b* is fixed to the bolts 23*a* and 23*b* on the vehicle body. The bands 22 are put over the bracket 21, and are fixed to the locks 26 of the bracket 21. Even if battery modules have different sizes or heights, such differences can be absorbed by appropriately positioning the belts 22 and the locks 26. This improves the workability and enables the battery modules to be reliably fixed to the vehicle body without applying unnecessary loads to them.

Further, the metal bracket 21 is attached to the side surfaces 5*c* of the battery unit where there are no terminals 210. Even if the battery unit 5A (battery modules 5*a* and 5*b*) happens to move due to bumping energy applied to the electric vehicle 1, the metal bracket 21 can keep its posture, prevent itself from coming into contact with the terminals of the battery unit 5A, and reliably hold the battery unit 5A on the vehicle body.

The check plates 24 and 25 may be welded to the opposite ends 21*a* and 21*b* of the bracket 21. When considering the assembling efficiency with the bolts 23*a* and 23*b*, it is preferable that the check plates 24 or 25 are detachably engaged with the ends 21*a* and 21*b*. The check plate 24 (or 25) is engaged with the bolt 23*a* (or 23*b*) first of all, and then the remaining check plate 25 (or 24) may be engaged with the bolt 23*b* (or 23*a*). This absorbs manufacturing differences of the bracket 21 and bands 22, and positional differences of the bolts 23*a* and 23*b*, and enables the battery module 5A to be fixed without any unnecessary loads, and improves the assembling work. Alternatively, the check plate 24 may be pinned to the bracket 21 with a space maintained between them.

Figure 6:
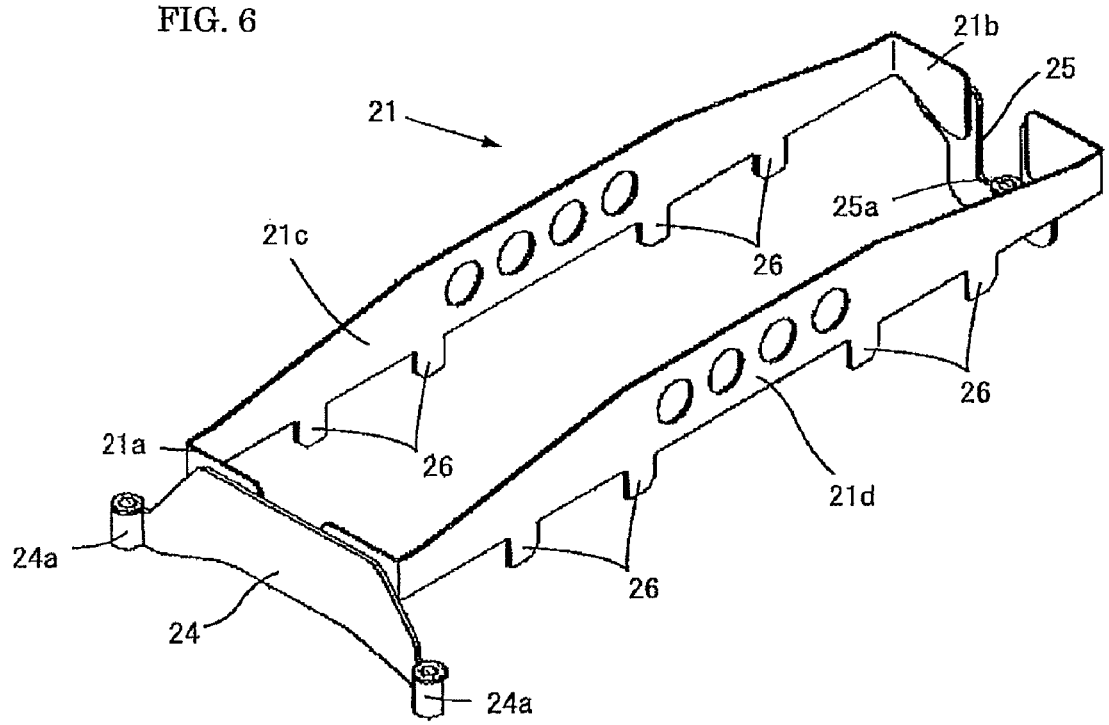
FIG. 6 is an enlarged perspective view of a bracket including a plurality of nutsnuts.

In the foregoing embodiment, the check plate 24 has the cylindrical part 24*a* into which the blot 23*a* fitted while the check plate 25 has the cylindrical part 25*a* into which the bolt 23*b* is fitted. Alternatively, the check plate 24, for instance, may have a plurality of (two, for instance) bolts 24*a* which are spaced apart in the width direction X of the electric vehicle and with a space maintained between them, as shown in FIG. 6. In such a case, it is possible to reduce loads applied to the bolt 23*a* when the electric vehicle suffers from bumping energy, which is effective in reliably fixing the battery module 5A to the vehicle body and protecting it against crackup of the electric vehicle.

Figure 7A:
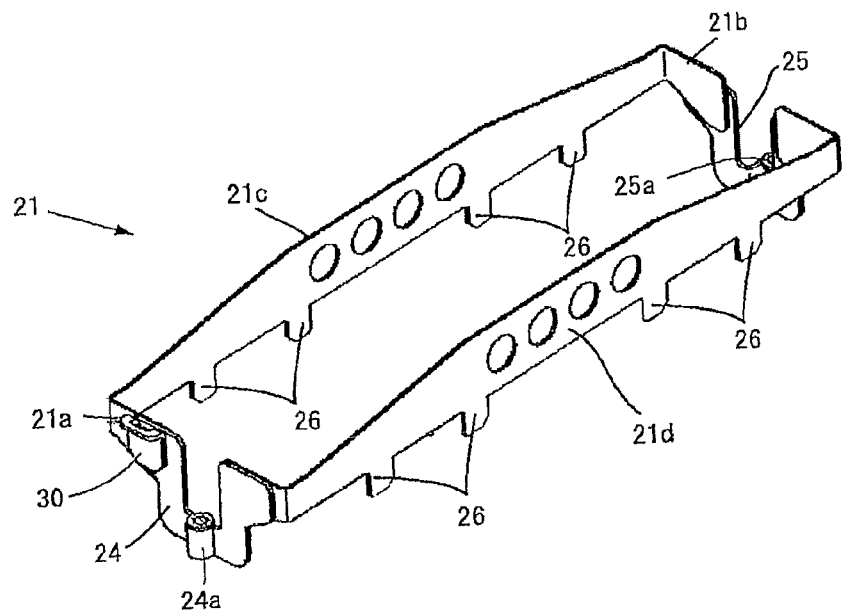
FIG. 7(a) is an enlarged perspective view of a bracket including a hook.
Figure 7B:
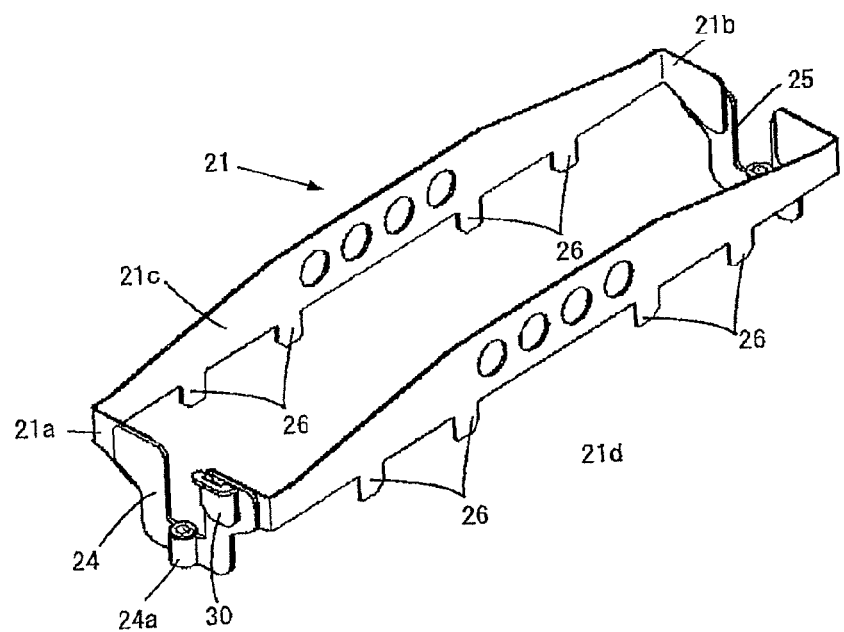
FIG. 7(b) is an enlarged perspective view of a bracket including a hook which is positioned opposite to the hook shown in FIG. 7(a).

Referring to FIG. 7(*a*) and FIG. 7(*b*), the check plate 24 may be provided with a hook 30, which is effective in easily fixing accessories near the battery module 5A.

Figure 8:
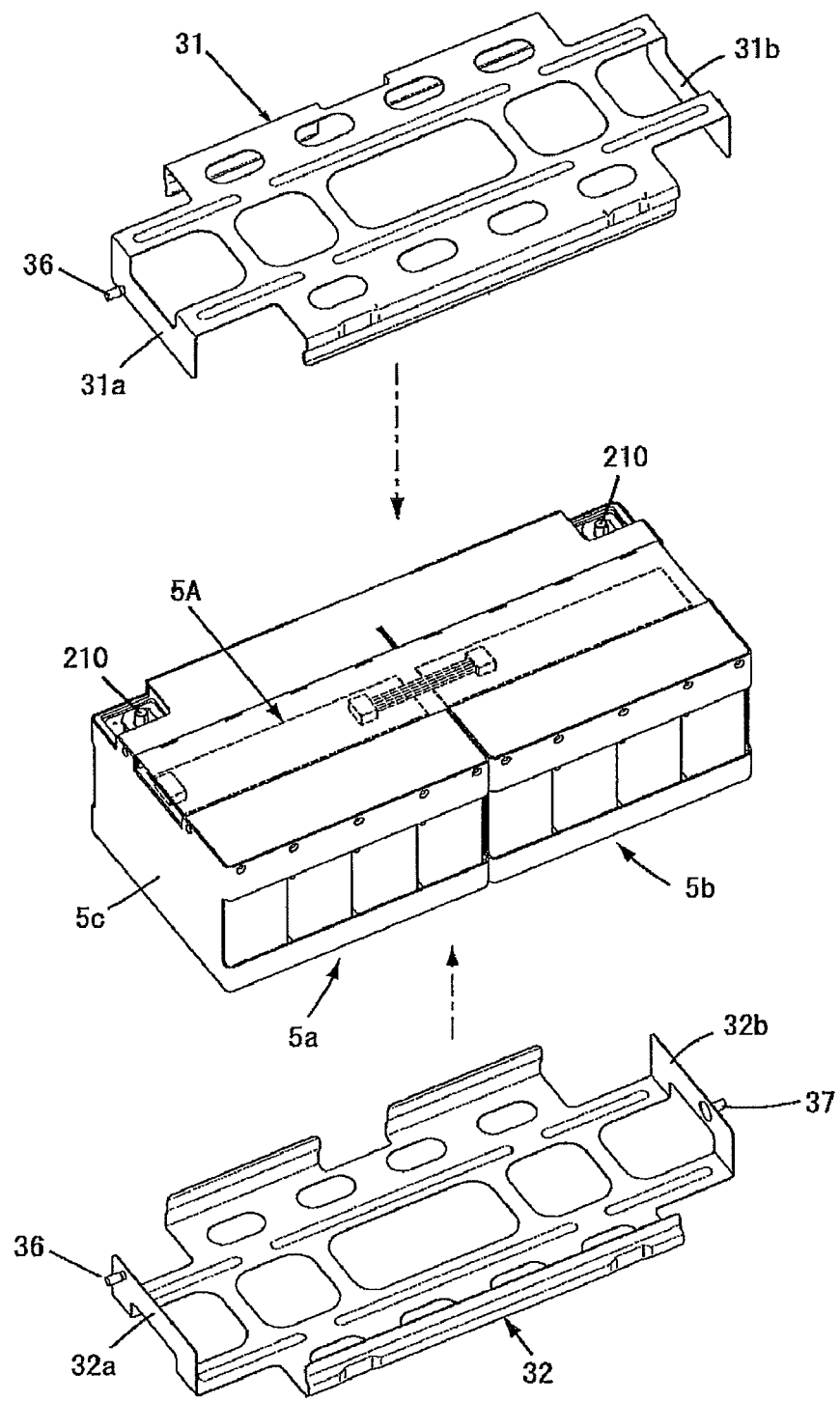
FIG. 8 is an exploded perspective view of a pair of brackets and a battery module which are fixed by a battery positioning structure according to another embodiment of the invention.
Figure 9:
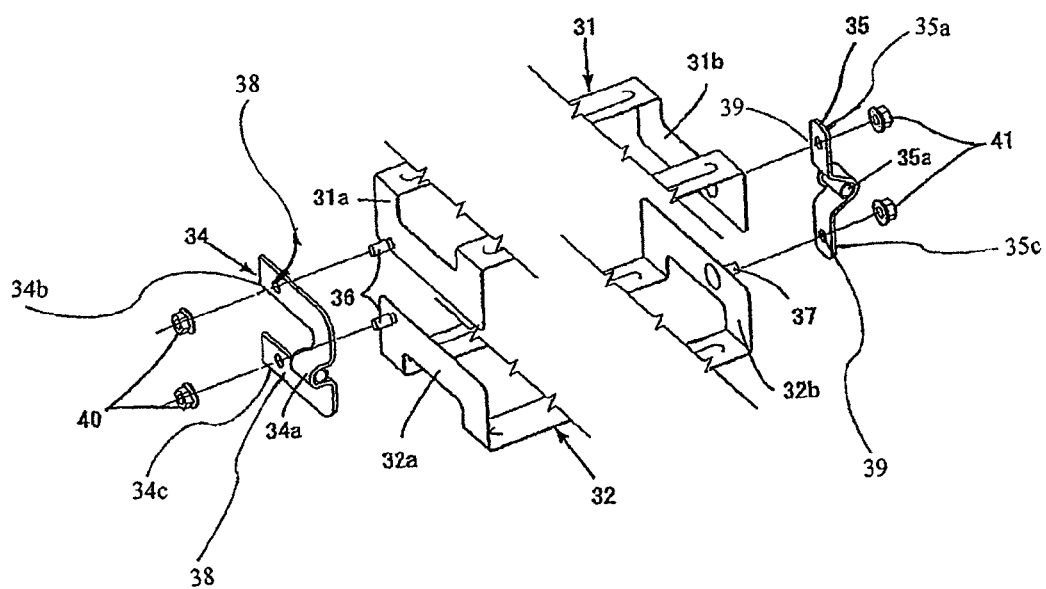
FIG. 9 is an enlarged view showing how the brackets and check plates are arranged in the battery fixing structure.

FIG. 8 and FIG. 9 show a battery positioning structure according to another embodiment of the invention. This embodiment differs from the foregoing embodiment in that the belts 22 are not used. The same battery positioning structure is applied to the battery units 5A to 5L. It is assumed that the battery positioning structure is applied to the battery unit 5A. The battery positioning structure includes: a pair of brackets 31 and 32 which are attached to an outer surface 5*c* of the battery cells 5*a* and 5*b* and extend in the travelling direction X of the electric vehicle; and check plates 34 and 35 which are detachably attached to the brackets 31 and 32, and include folds 34*a* and 35*a* to be engaged with the bolts 23*a* and 23*b*. When the brackets 31 and 32 are attached to the battery unit 5A and the check plates 34 and 35 are attached to the brackets 31 and 32, the battery cells 5*a* and 5*b* are made integral with the brackets 31 and 32.

The brackets 31 and 32 are made of metal, and have their four sides folded. The bracket 31 has its one side shaped not to come into contact with the terminals 210 of the battery module 5A.

The brackets 31 and 32 respectively include bolts 36 and 37 at their opposite ends 31*a* and 31*b*, and 32*a* and 32*b*, to which the check plates 34 and 35 are attached.

The check plates 34 and 35 are in the shape of letter U, and have folds 34*a* and 35*a*. Further, the check plates 34 and 35 have holes 38 and 39 on the opposite ends 34*b* and 34*c* and on the opposite ends of 35*b* and 35*c*. The bolts 36 and 37 are fitted into the holes 38 and 39. The check plates 34 and 35 are attached to the brackets 31 and 32, the bolts 36 and 37 are fitted into the holes 38 and 39, and are fastened by nuts 40 and 41.

To be more specific, the brackets 31 and 32 cover the outer surfaces 5*c* of the battery cells 5*a* and 5*b*, the check plates 34 and 35 are temporally attached to the brackets 31 and 32 using the nuts 40 and 41, the bolts 23*a* and 23*b* are fitted into the folds 34*a* and 35*a* and are fastened, and the nuts 40 and 41 are firmly fitted into the bolts 36 and 37. In this state, the check plates 34 and 35 are firmly fixed to the brackets 31 and 32.

According to the battery positioning structure, the brackets 31 and 32 extend over the outer surfaces 5*c* of the battery modules 5*a* and 5*b*, and serve as one integral unit. The check plates 34 and 35 are attached to the brackets 31 and 32 by fitting the bolts 23*a* and 23*b* (on the shield plate 7) into the folds 34*a* and 34*b*. Even when there is a space between the battery cells or even when the battery cells have different heights, the check plates 34 and 35 are fixed to the brackets 31 and 32 after aligning the folds 34*a* and 34*b* and the bolts 23*a* and 23*b*. This enables the battery modules 5*a* and 5*b* to be efficiently positioned on the vehicle body without applying unnecessary loads to them.

The brackets 31 and 32 are made of steel plates, and are shaped not to come into contact with the terminals 210 of the battery cells. Therefore, even when the battery modules 5*a* and 5*b* are moved due to crash energy applied to the vehicle body, the brackets 31 and 32 protect them by their rigidity, and do not come into contact with the terminals 210 of the battery modules 5*a* and 5*b*. The brackets 31 and 32 can reliably position the battery unit 5 on the vehicle body, and protect it against energy applied by the crash.

INDUSTRIAL APPLICABILITY

The invention is applicable battery positioning structures which can reliably fix battery modules even if there are spaces between them or they have different heights.

The invention claimed is:
1. A battery positioning structure for an electric vehicle which includes a battery unit, the battery positioning structure comprising:
   a pair of an upper bracket and a lower bracket provided on an outer surface of the battery unit and facing each other, the upper bracket supporting an upper portion of the battery unit, and the lower bracket supporting a lower portion of the battery unit; and check plates that extend between and are detachably attached to respective end portions of the upper and lower brackets to connect the upper and lower brackets, and have securing portions, a first portion of each check plate being directly connected to the upper bracket and a second portion of the check plate being directly connected to the lower bracket, wherein the battery unit is positioned on a body of the electric vehicle by securing the check plates to the body via the securing portions.

2. The battery positioning structure defined in claim 1, wherein the upper and lower brackets are made of steel plates, and either the upper or lower bracket is shaped not to come into contact with terminals of the battery unit.

3. The battery positioning structure as defined in claim 1, wherein each of the securing portions is a cylindrical part for receiving a bolt for securing the check plate to the vehicle.

4. The battery positioning structure as defined in claim 1, wherein one of the check plates has a plurality of securing portions.

5. The battery positioning structure defined in claim 1 or 2, wherein each of the brackets has four folded sides.

6. The battery positioning structure defined in claim 1, wherein the check plates are in the shape of letter U.

7. The battery positioning structure defined in claim 1, wherein the battery unit includes a plurality of battery modules.

8. A battery positioning structure for an electric vehicle which includes a battery unit, the battery positioning structure comprising:

a pair of a first bracket and a second bracket provided on an outer surface of the battery unit, support opposite side portions of the battery unit, and face each other;

check plates that extend between and are detachably attached to respective end portions of the first and second brackets to connect the first and second brackets, and having securing portions, a first portion of each check plate being directly connected to the first bracket and a second portion of the check plate being directly connected to the second bracket, wherein the battery unit is positioned on a body of the electric vehicle by securing the check plates to the body via the securing portions.

9. The battery positioning structure defined in claim 8, wherein the first and second brackets are made of steel plates, and either the first or second bracket is configured not to come into contact with terminals of the battery unit.

10. The battery positioning structure for an electric vehicle defined in claim 8 or 9, wherein the first and second brackets have four folded side portions.

11. The battery positioning structure defined in claim 8, wherein the check plates have folds to be engaged with bolts of a shield plate.

12. The battery positioning structure defined in claim 1, wherein the upper bracket is spaced apart from the lower bracket, such that the upper bracket makes no direct contact with the lower bracket.

13. The battery positioning structure defined in claim 8, wherein the first bracket is spaced apart from the second bracket, such that the first bracket makes no direct contact with the second bracket.

* * * * *